United States Patent
Kekicheff et al.

(10) Patent No.: US 10,397,215 B2
(45) Date of Patent: Aug. 27, 2019

(54) SECURE ELEMENT INSTALLATION AND PROVISIONING

(71) Applicants: Marc Kekicheff, San Francisco, CA (US); Kiushan Pirzadeh, Foster City, CA (US); Yuexi Chen, Foster City, CA (US)

(72) Inventors: Marc Kekicheff, San Francisco, CA (US); Kiushan Pirzadeh, Foster City, CA (US); Yuexi Chen, Foster City, CA (US)

(73) Assignee: VISA INTERNATIONAL SERVICE ASSOCATION, San Francisco, CA (US)

( * ) Notice: Subject to any disclaimer, the term of this patent is extended or adjusted under 35 U.S.C. 154(b) by 113 days.

(21) Appl. No.: 15/277,618

(22) Filed: Sep. 27, 2016

(65) Prior Publication Data
US 2018/0091498 A1  Mar. 29, 2018

(51) Int. Cl.
*H04L 29/06* (2006.01)
*H04L 9/08* (2006.01)
*H04L 9/00* (2006.01)

(52) U.S. Cl.
CPC .......... *H04L 63/0823* (2013.01); *H04L 9/006* (2013.01); *H04L 9/0866* (2013.01); *H04L 9/0869* (2013.01); *H04L 63/0407* (2013.01); *H04L 63/0853* (2013.01); *H04L 63/0876* (2013.01)

(58) Field of Classification Search
CPC ............ H04L 63/0823; H04L 63/0435; H04L 9/0662; H04L 63/0876; H04L 63/0853; H04L 63/0407; H04L 9/0869; H04L 9/006; H04L 9/0866

USPC ......................................................... 713/156
See application file for complete search history.

(56) References Cited

U.S. PATENT DOCUMENTS

| | | | | |
|---|---|---|---|---|
| 3,872,450 | A * | 3/1975 | Reynolds | G11C 17/16 257/390 |
| 2005/0268115 | A1* | 12/2005 | Barde | G06F 21/10 713/189 |
| 2006/0072748 | A1 | 4/2006 | Buer | |
| 2006/0090070 | A1* | 4/2006 | Bade | G06F 21/57 713/164 |
| 2007/0283426 | A1 | 12/2007 | Houssier | |

(Continued)

OTHER PUBLICATIONS

Physically Unclonable Functions found in Standard Component of Commercial Devices, Andre Schaller (Year: 2013).*

(Continued)

*Primary Examiner* — Alexander Lagor
*Assistant Examiner* — Vu V Tran
(74) *Attorney, Agent, or Firm* — Loeb & Loeb LLP

(57) ABSTRACT

A device binding system includes generating and storing at the device a unique identifier based on device characteristics and a cryptographic function. The unique identifier is then registered with an authority. The self-generation of the unique identifier allows binding with an authority to occur after the device leaves a secure manufacturing environment or even after the device is in the hands of an end-user consumer. Once the binding occurs, the device can be part of trusted transactions for location tracking, fitness tracking, financial transactions or other interactions where identity and privacy are factors.

16 Claims, 6 Drawing Sheets

(56) References Cited

U.S. PATENT DOCUMENTS

| | | | |
|---|---|---|---|
| 2010/0287622 A1 | 11/2010 | Petkov | |
| 2011/0082966 A1* | 4/2011 | Yu | G06F 12/1408 |
| | | | 711/103 |
| 2013/0097274 A1* | 4/2013 | Moss | H04L 12/403 |
| | | | 709/208 |
| 2013/0312072 A1 | 11/2013 | Van Roermund | |
| 2014/0298025 A1 | 10/2014 | Burbank | |
| 2014/0315485 A1 | 10/2014 | Marie | |
| 2015/0278489 A1* | 10/2015 | Rombouts | G06F 8/61 |
| | | | 713/193 |
| 2015/0312255 A1* | 10/2015 | Libonate | H04L 63/0876 |
| | | | 713/168 |
| 2016/0080372 A1 | 3/2016 | Martin | |
| 2017/0034168 A1* | 2/2017 | Wilson | H04L 63/08 |
| 2017/0187537 A1* | 6/2017 | Kim | H04L 9/0866 |

OTHER PUBLICATIONS

Securing Communication Devices via Physical Unclonable Functions (PUFs), Nicolas Sklavos (Year: 2013).*
International Search Report and Written Opinion dated Jan. 4, 2018 for PCT/US17/54729, 10 pages.

* cited by examiner

SECURE ELEMENT INSTALLATION AND PROVISIONING

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Identification of items is a common practice. In the past, for everything from a driver's license to an insurance card, the name of the end user was known at the time the identification card was issued. However, now that virtually any object that uses electricity can be a connected device, for example the Internet of Things (IoT), there is an explosion in the number of devices that must be given a verifiable identity in order to securely communicate on behalf of an entity such as an owner of the device

SUMMARY

Connected devices include hundreds of millions of cell phones and now additional millions, if not billions, of automobiles, electric meters, kitchen appliances, watches, and other wearable devices. In order for these devices to interact effectively as a part of connected systems it is necessary for each device to have a unique identifier that can be bound to an owner or other kind of account for the purpose of pairing, establishing ownership, transaction processing, or record keeping such as fitness tracking, or online data access, such as iTunes.

Attempts to centrally pre-assign known numbers to devices and bind them to owners at the time of manufacture or sale have been overwhelmed by the sheer volume of candidate products being produced as well as by the late binding required by mass-sale consumer products, for example, connected watches and fitness trackers.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
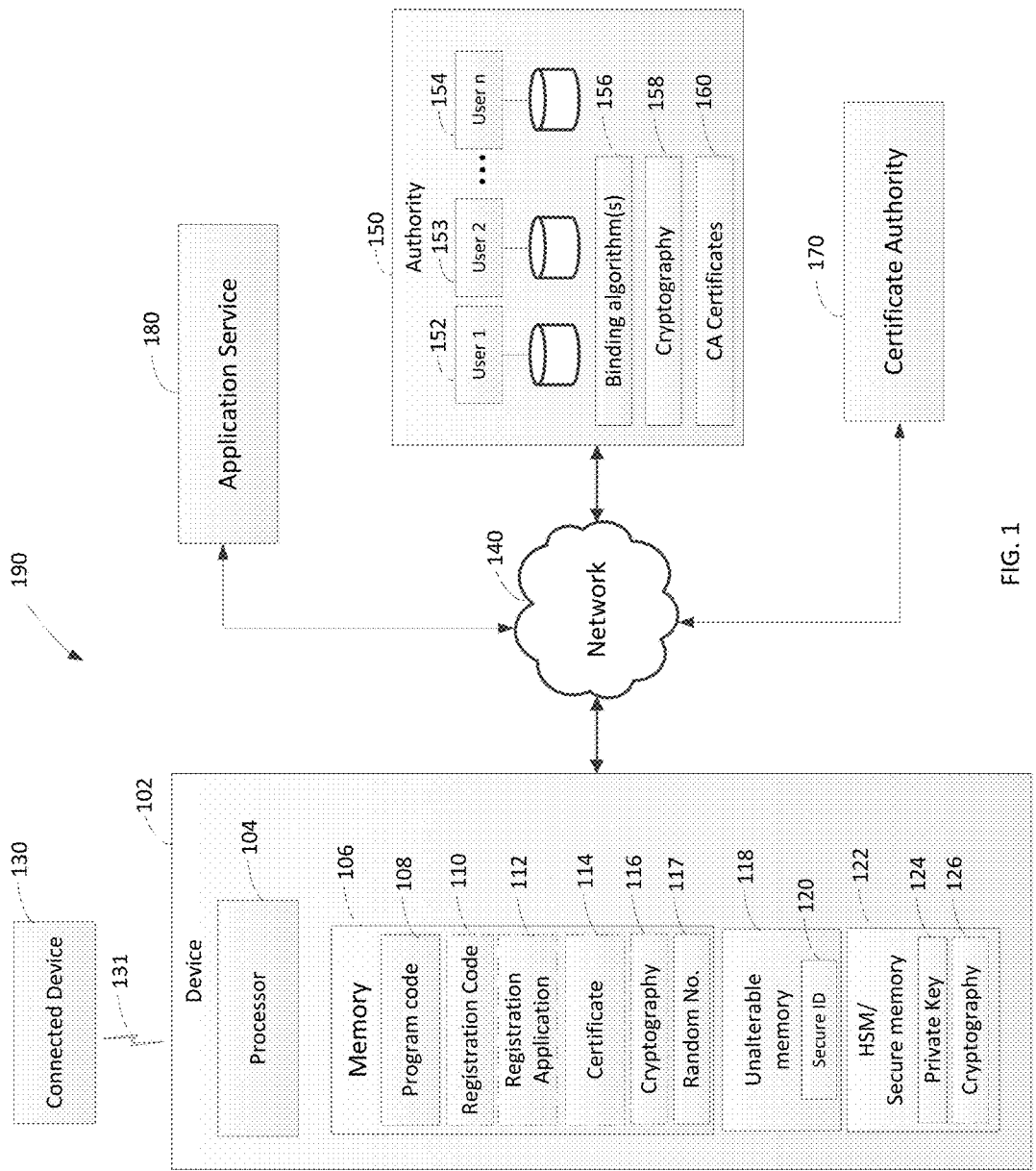
FIG. 1 is a block diagram a system for generation of a secure identifier at a device and registration of the device with an authority.

The explosion in the number of devices requiring binding (or registration) with an authority has increased significantly in the last several years, especially with the advent of connected devices such as connected wearable devices and the Internet of Things (IoT) including, but not limited to, watches, fitness trackers, automobiles/key fobs, thermostats, home security systems, refrigerators and other appliances. In order for the device to provide meaningful information to or on behalf of the device owner, an authority, such as a service provider, must be able to uniquely identify the device from amongst potentially billions of other such devices. The consequences of duplication of unique identifiers can be far reaching with implications into the fields of healthcare, personal security, personal privacy, or finances should multiple devices accidentally, or worse, deliberately be registered to the wrong entity.

Past attempts to proactively assign unique identifiers to devices at the time of manufacture have failed due to the number of manufacturers, the global nature of marketplace, and the late binding between devices and related authorities, often well after the original sale of the device. The need to establish trust between the device and the authority is not reduced by these factors, as the devices may be called on to share personal data, enter contractual relationships, or verify an identity of an individual, e.g., for boarding an airplane, to name a few.

The following description uses the term secure identifier for the identifier generated at a device to give a unique identity to the device. The identifier is secure in that it is unaltered after generation, but is not secret in that once generated, the identifier may be shared with other entities beyond the device.

As opposed to prior art system that centrally assign identifiers, a process for creating identifiers at the device and subsequently registering them with an authority moves the creation of a globally unique and secure identifier to the device itself. Ensuring that the self-generated identifier is sufficiently unique, relocating the generation of the secure identifier to the device allows the registration process to be implemented both as needed and when needed. Should an identifier be needed at the time of issuance, such as for a smart card-based driver's license, the process of generating the unique and secure identifier can be performed while the device is still in the hands of the issuing agency. If the device, such as a fitness tracker, is registered after delivery to the end user the process can be performed at the time of registration, with or without explicit involvement of the user/owner. Lastly, if the device is never registered, such as a connectable watch that is used simply as a watch, no extra data is being stored at a potential registration site for a device that will never be registered. That is, an exhaustive list of every possible device that could be registered is not required. Only those devices that require a particular service are registered with that service. Further, since the secure identifier generation process is designed to be globally unique over all possible devices, the device's secure identifier can be used by multiple services associated with the same device, such as a coffee shop loyalty system and a building access system.

In an embodiment, a combination of device data and random numbers are processed by a cryptographic algorithm to ensure that the identifier is sufficiently unique to not be aliased by another identifier, even in a field of billions of devices. As long as the device can store the identifier securely so that its value does not change, the trust relationship established during registration (or binding) is persistent over the life of the device without regard to other devices in the field.

FIG. 1 generally discloses components usable for generating and installing a secure identifier in a device 102 for the purpose of binding the device 102 to an authority 150. In an embodiment, the authority 150 is an entity that receives information from the device and, in some cases, acts on the information received from the device to perform a service either with respect to device itself or on behalf of a user of the device. Exemplary use cases are discussed in more detail below.

A device 102, in an embodiment, has a processor 104 that executes instructions stored in a memory 106. The memory 106 includes program code or instructions 108 that provides core functionality to the device 102, such as in one embodiment, fitness tracking where the program code 108 executes in combination with other sensors (not depicted) that may be used to determine heart rate, step count or other health-related statistics. The memory 106 can also include, in various embodiments, registration code 110 and/or a registration application 112 used for generation of a secure identifier 120 and subsequent binding or registration of the device 102 with the authority 150.

In an embodiment, the memory 106 includes a certificate 114. The certificate 114 may be a public key infrastructure (PKI) certificate in an X.509 format. When participating in a PKI environment, the certificate 114 may be requested from a certificate authority 170 although other parties, such as a registration authority (not depicted) may also be involved. The certificate authority 170 will establish an identity of the device owner, or in some cases, the device 102 itself and generate the certificate 114 which includes the device public key signed by the certificate authority private key. This allows verification of the device public key using the certificate authority public key.

The memory 106 may also include, in various embodiments, cryptographic routines 116 that can be used to implement key generation, random number generation, signing, and encryption. In some embodiments, these functions may be supported in either the registration application 112, a hardware security module (HSM) or a combination of these. A random number, or more likely, a pseudo-random number 117 may be generated and stored, at least temporarily, on the device 102.

The device 102 also includes an unalterable memory 118. There are various forms of unalterable memory, some referred to as "write once, read many" (WORM) including, but not limited to, a fuseable link memory. Other programmatic steps can be taken to ensure that once written, a memory location is not over-written or erased. The unalterable memory 118 is used to store the secure identifier 120 that is the basis of trust between the device and the authority 150. In some cases, the entire memory 118 is protected after the desired write process while in other cases only a portion of the memory 118 is protected, allowing additional data to be written to the memory 118 without disturbing previously written data. Because the memory 118 is used to store information that binds the device 102 to an authority, it is preferable that the memory 118 physically is difficult to remove from the device 102. In an embodiment, the unalterable memory 118 may be permanently attached to a main board of the device 102, such as with an epoxy "potting" compound such that an attempt to remove the memory 118 is likely to permanently damage both the memory 118 and the device 102.

In some embodiments, the device 102 may also include a hardware security module (HSM) 122. In those instances, the HSM 122 provides cryptographic services 126 in addition to or instead of those services being provided by cryptographic program 116. The HSM 122 may also be a repository for private keys and, in an embodiment, may be the storage location for the secure identifier 120 because the HSM 122 is likely to have as part of its security features the capability to securely store data.

The device 102 communicates with external entities either via a direct connection to a network 140 or through a connected device 130, as discussed in more detail below. An application service 180, for example, the iTunes Store or Google Play can be used to download the registration application 112 to the device 102. Alternatively, other sources, such as a service provider can also supply the registration application 112.

The authority 150 stores, in an exemplary embodiment, information about a plurality of users and devices illustrated as user data stores 152, 153, and 154. The authority 150 also includes executable code 156 for server-side execution of a process for binding the device 102 to the authority during the registration process.

In various embodiments, a device binding system 190 not only includes the device 102 and the authority 150 but the certificate authority 170 as well. In such embodiments, the authority 150 also includes cryptographic services 158 and other related information that may include certificates 160 issued by a certificate authority (CA) 170 for verification of the device credentials, when presented. In yet other embodiments, the application service 180 is used to download the registration application 112 even though the application service 180 is not explicitly a part of the device binding system 190. These and other variations are discussed in more detail below.

Once the device 102 is bound at the authority 150, the secure identifier 120 can be used as a basis of trust for future interactions with the authority 150 or a related entity such as a music site, health site, shopping site, etc. The math associated with the uniqueness of the secure identifier is discussed below, however, in the extremely unlikely event that another device has the same unique identifier, the duplicate number can be flagged at the time of registration and a the device 102 can be requested to generate a new secure identifier 120. A time displacement between registration operations, differences in device characteristics, and a location of the requester, among others, can be used to identify that a second device is attempting to register with the duplicate secure identifier 120. However, as discussed below, the chance of a duplicate is extremely low.

Figure 2:
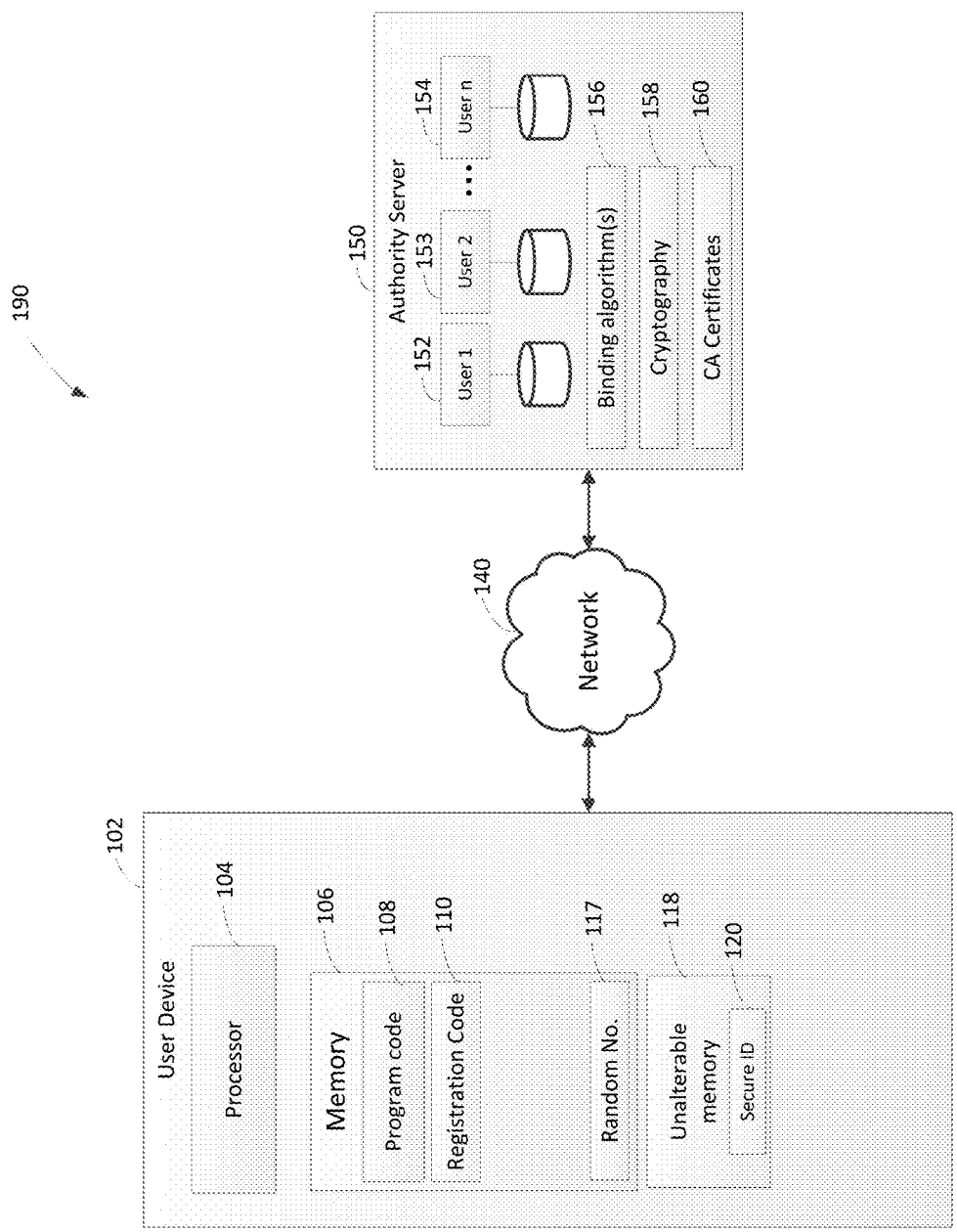
FIG. 2 is an alternate embodiment of the system for secure identifier generation and device registration.

FIG. 2 is a diagram illustrating one embodiment of the device binding system 190 with a minimally configured device 102. In this embodiment, the device 102 is connected to the authority 150 via the network 140. The device 102 has local registration code 110 that is used to generate the secure identifier 120. The device 102 stores the secure identifier 120 in an unalterable memory 118. The registration code 110, in combination with the device program code 108 may, in one case, provide a user interface (not depicted) for performing the registration process. In this embodiment, the device 102 executes the registration code which connects to the authority 150. The user may be prompted to enter identifying information establish identity prior to allowing the binding. In the case where personal information is being tracked by the device, such as eating habits, fitness routines, or even financial tracking, the authority 150 will establish the owner's identity so that subsequent information sent from the device can be correctly attributed to the owner. Processes for identifying a user are well known and may include matching login information with a previously established account, matching identifying information such as driver's license or passport information with the user, or the use of two factor identification involving sending a passcode to another device such as a cell phone known to be affiliated with the user. Alternatively, the registration may be anonymous with the knowledge that future access will be based only on credentials established during the registration process. In one such case, an ID and password can be established along with the secure identifier during the binding process. In another case, only the secure identifier 120 may be used and the data is stored anonymously based solely on the secure identifier 120. In the embodiment illustrated in FIG. 2, a public/private key pair may be generated on the device 102 so that the device 102 can sign, for example, the secure identifier 120. However, the process involving signing and encryption is more suitable to the embodiment illustrated in FIG. 3.

Figure 3:
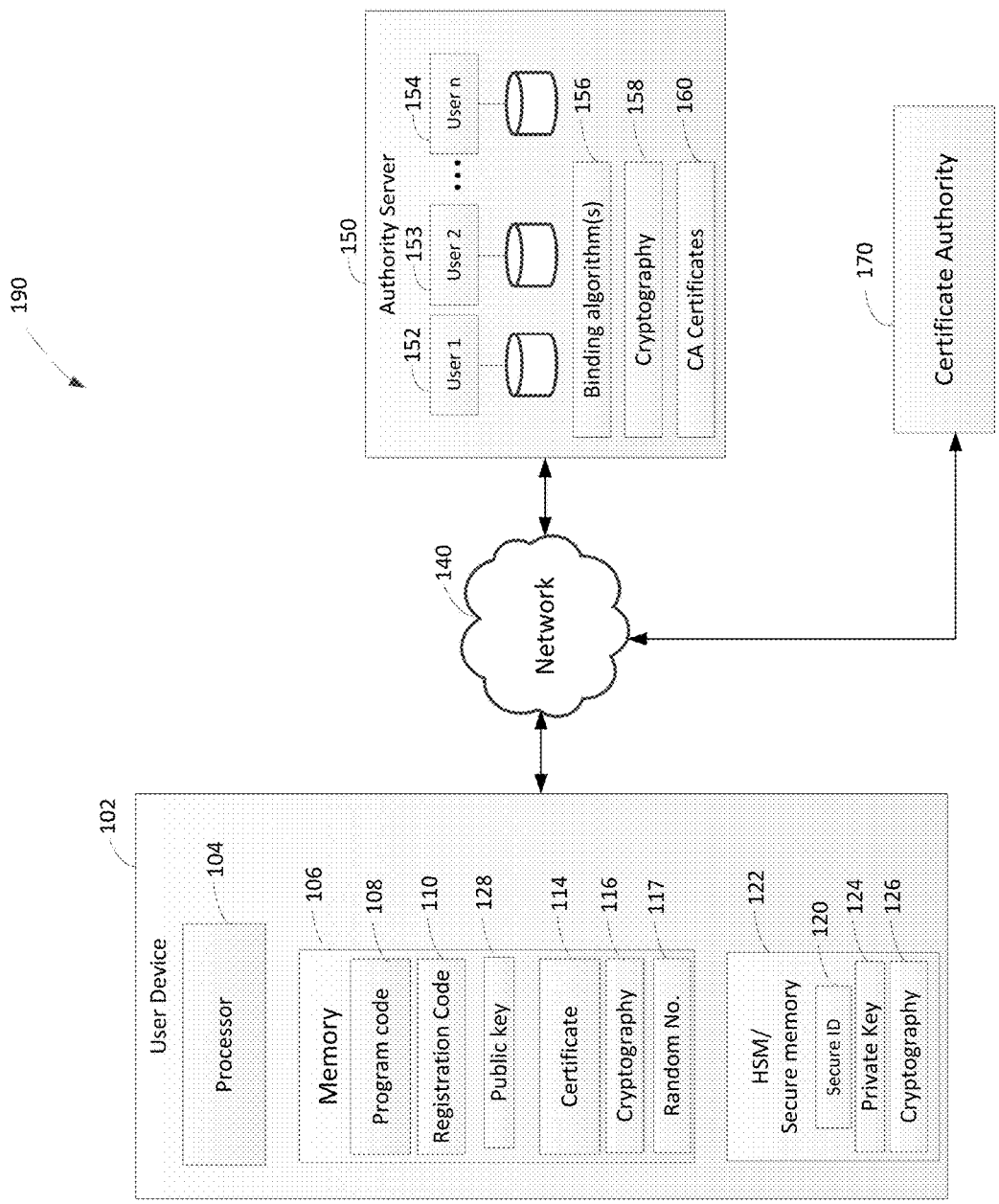
FIG. 3 is another embodiment of the system for secure identifier generation and device registration.

The use of public key infrastructure (PKI) as part of establishing and maintaining the trust relationship between the device 102 and the authority 150 is shown in FIG. 3. In this exemplary embodiment, the device 102 is shown as having an HSM 122, however, the HSM 122 is not a requirement. This illustrated embodiment also shows that the HSM 122, when present, can be used to store the secure identifier 120 as an alternative to storage in the unalterable memory 118.

The device 102 generates a PKI key pair, one stored locally and not shared, making it the private key 124, the other key of the key pair being the public key 128 which is freely shared. The embodiment of FIG. 3 uses a certificate authority (CA) 170 to sign the device's public key after sending the public key to the CA 170 and performing some level of identity verification. In an embodiment, the CA 170 may verify an identity of the device owner/user while in another embodiment, the device 102 may have separate credentials that are tied to the identity being bound to the public key. The CA 170 then issues a certificate 114 that includes the public key 128 signed by the CA private key (or equivalent sub-key) so that a subsequent participant can trust data signed by the device private key 124. The details of trust relationships in a PKI infrastructure are well known in the industry.

After the CA 170 provides the certificate 114 to the device 102, the device 102 can use the certificate 114 as part of the binding process. For example, the device 102 can sign (encrypt) the secure identifier 120 with its private key 124 and provide the signed private key and the certificate 114 to the authority 150. The authority 150 can then verify an identity associated with the device 102 by confirming the validity of the certificate 114 and determining the identity via the certificate 114 or the CA 170.

Figure 4:
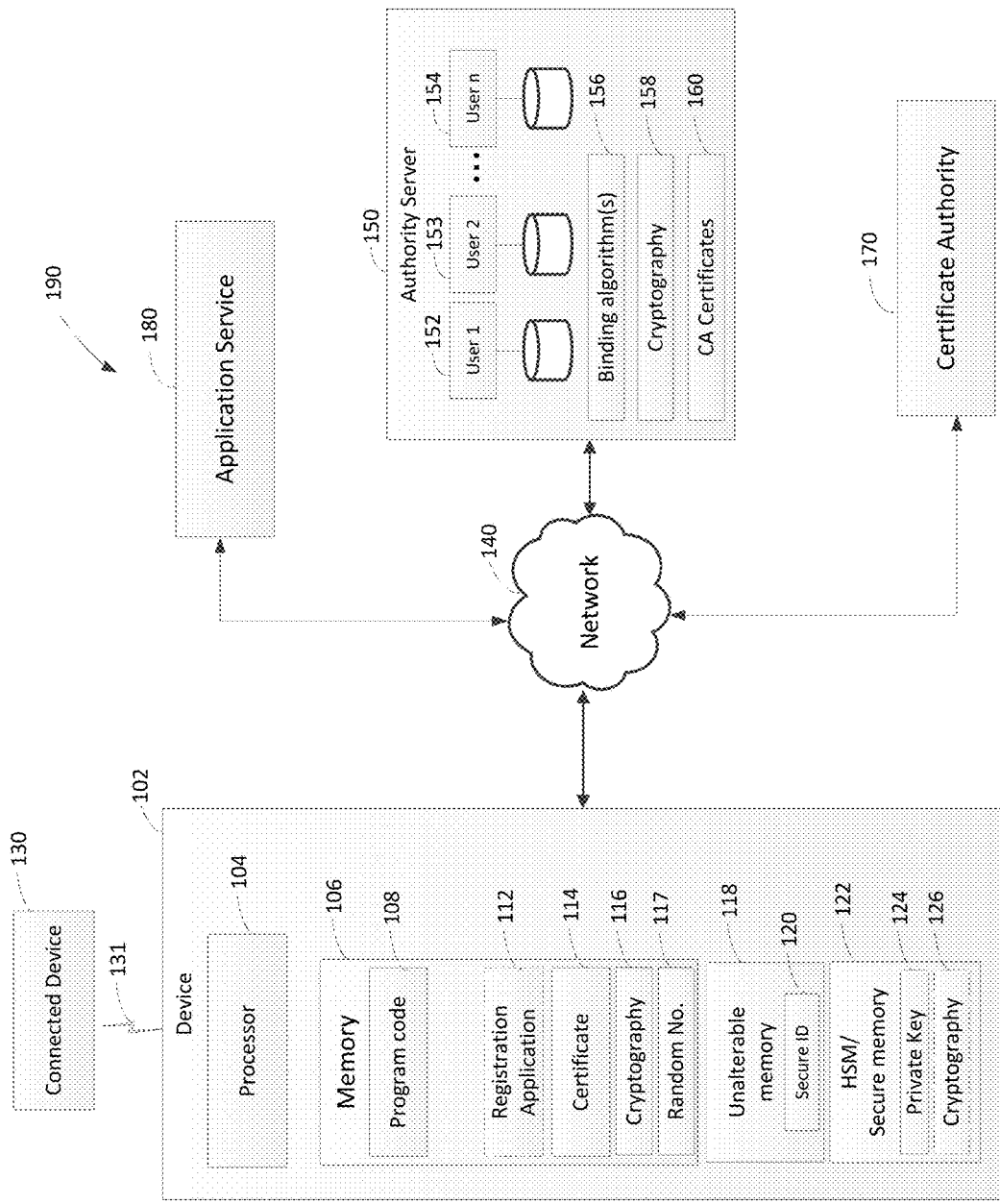
FIG. 4 is yet another embodiment of the system for secure identifier generation and device registration.

FIG. 4 is an alternate embodiment of the system described above illustrating that the registration process may be supported by a registration application 112 that is downloaded prior to the binding process. The registration application 112 may be installed on the device 102 from an application service 180. In one embodiment, the device 102 directly supports downloading and executing the registration application 112. Once downloaded, the application 112 is used for the generation of the secure identifier 120 and subsequent registration procedure discussed briefly above and in more detail below. In one embodiment, the registration application 112 may include the cryptographic routines required to generate and use public/private key pairs.

In another embodiment, a connected device 130, such as a smart phone may provide a user interface for downloading the application 112, executing the registration process, or both. That is, even though the registration application 112 may be stored on and executed by the device 102, the connected device 130 can provide a display and a keyboard (not depicted) useful for receiving prompts and entering data used by the device 102. Other variations for location and execution of the registration application 112 are possible.

Figure 5:
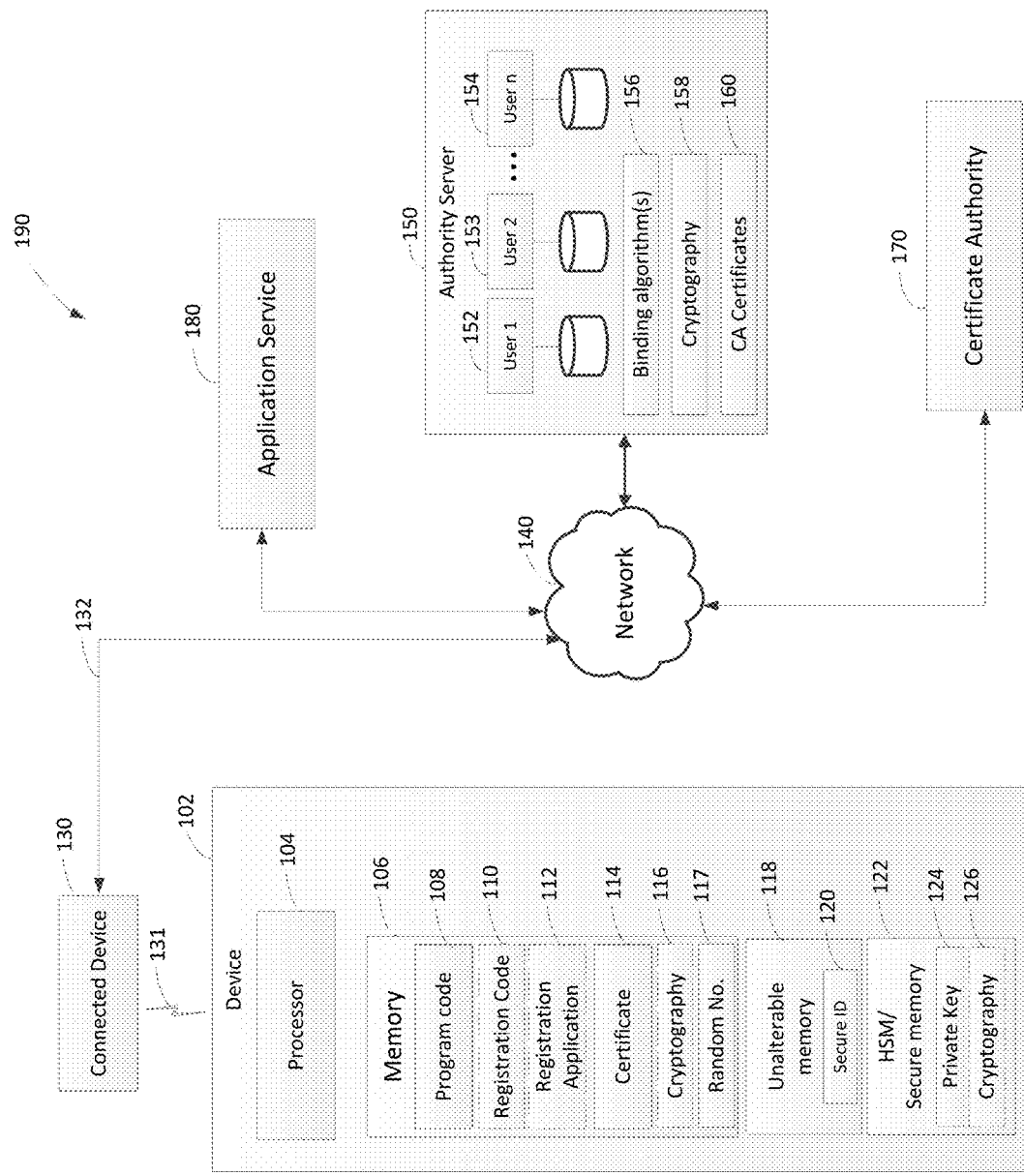
FIG. 5 is still another embodiment of the system for secure identifier generation and device registration.

A variation shown in FIG. 5 illustrates that the connected device 130 can also provide a wide-area network connection 132 that supports a data connection between the user device 102 and the network 140. In an embodiment, the user device 102 is networked to the connected device 130 via a physical connection, a Bluetooth™ or a near-field communication (NFC). The connected device 130 is coupled to the network 140 via WiFi or a cellular data connection such as WiMax or 4G LTE. The device 102 is then able to communicate via the network 140 through this indirect connection. Some smaller devices, such as wearable devices or smart cards may not be able to support direct connections to a network 140 via wide area network. This additional capability allows even more devices to participate in this late binding process.

Figure 6:
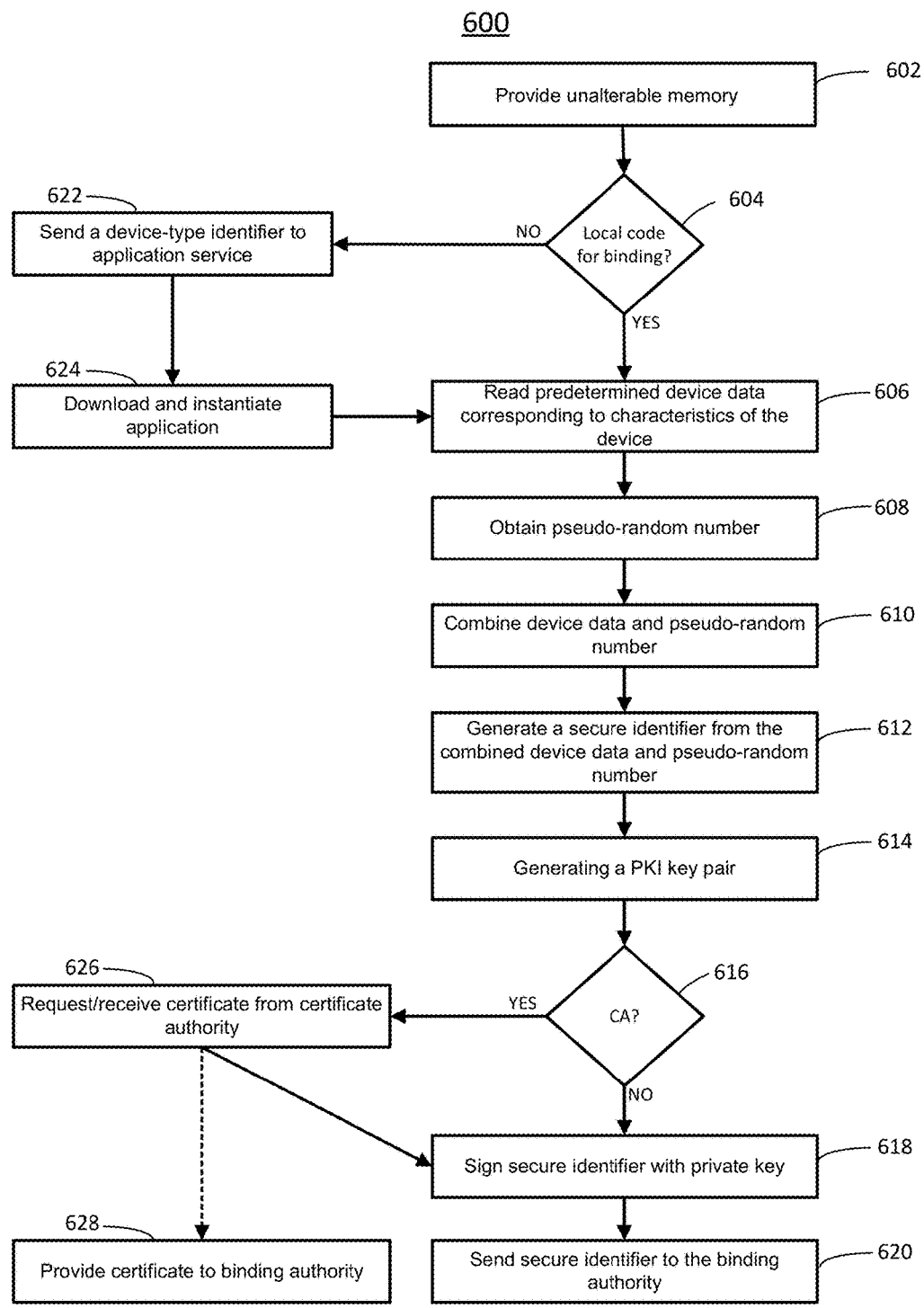
FIG. 6 is a flow chart of a method for secure identifier generation and device registration.

FIG. 6 is a flow chart illustrating one method 600 of binding a device 102 to an authority 150. In this embodiment, the method 600 generally outlines a two-step process to generate a secure identifier 120 and then to register that secure identifier 120 with an authority 150. At block 602, an unalterable memory 118 is provided in the device 102 to permanently store information. In an embodiment, the unalterable memory 118 is a fuseable link memory. In an alternate embodiment, a hardware security module (HSM) 122 is used instead of or supplementary to the unalterable memory 118 such that the HSM 122 can be used to store information that must remain unaltered.

At block 604, a determination is made if registration code 110 is available locally for performing a binding operation. For example, the registration code 110 may be installed at the time of manufacture. If yes, that is, that code embedded in the device 102 at the time registration is requested is available, execution continues at block 606. If, at block 604, no code is available for device registration, execution may continue at block 622 where the device 102 sends enough information about itself so that an application service 180 can determine what version registration application to deliver. For example, the application service 180 may need to know the device manufacturer, model number and operating system version in order to deliver the correct registration application 112. In an embodiment, the registration application 112 may also be specific to an authority 150 to which the device 102 will be bound. That is, a coffee shop may use a different registration application than a financial institution. However, in other embodiments, once a secure identifier 120 is generated, it is possible to use that secure identifier 120 for multiple authorities. In that case, a single registration code 110 or registration application 112 may be sufficient for all needs. At block 624, the correct registration application 112 is downloaded and instantiated. In an embodiment, the registration application 112 is downloaded at the time of binding. The registration application 112 may also include executable code that performs cryptographic functions 116 used to generate the secure identifier 120, discussed more below. In other embodiments, the cryptographic functions 116 are native to the device 102, such as on HSM 122. Once the registration application 112 is installed and operational, execution of the method 600 continues at block 606.

Predetermined device data is read by the registration code 110 at block 606. Because the registration code 110 or the registration application 112 is device-specific, the device-specific data read can be tailored based on type. That is, different data is used when registering a smart phone vs. a fitness tracker, or even fitness trackers from different manufacturers. In an embodiment, a model number, serial number, and operating system version can be used as the device-specific data. In one embodiment, 60 bytes of device-specific data can be used. In some cases, the device-specific data is data from transient memory or a version number of a tool, such as a Java API. Since the operation to develop the secure identifier 120 is a one-time process on the device 102 only, and does not need to be recreated at another system element, such transient information may be used.

At block 608, a pseudo-random (or random) number 117 may be obtained. In various embodiments, the pseudo-random number may be generated by registration code 110 or the registration application 112, by local cryptographic code 116, by an HSM 122, or even received via a network connection 131 from another device, for example, the connected device 130, given trust in the device 130. In an embodiment, the pseudo-random number 117 may be 16 bytes.

The device-data and pseudo-random number are combined at block 610 to develop a base number. The base number is transient. In an embodiment, the combination may simply be a concatenation of the two numbers. Other combination techniques are available and well known, such as a bit XOR. The base number is transient and can be discarded after the secure identifier 120 is generated.

At block 612, the secure identifier is generated from the base number, that is the combination of the device-specific data and the pseudo-random number 117. In an embodiment, a one-way cryptographic hash is used to generate the secure identifier 120. Any of several well-known hashing functions could be used including MD5, SHA, or in one embodiment, a SHA 256 algorithm. In an embodiment, the resultant secure identifier 120 is a 32 byte number.

By way of comparison, a collision probability for a simple 16 byte random number is about $3.6e^{-20}$ using the formula:

$$p(n) = 1 - e^{\frac{n^2}{-2 \cdot 2^x}}$$

where the number of devices is 5 billion (n=5e9) and a 16 byte secure random is used x=128.

Alternatively, using the one way hash function to further process the larger base number has a collision probability of $1.0e^{-58}$ using the formula $$p(n) \leq \frac{n(n-1)}{2} \times \frac{1}{2^b}$$

where the number of devices, n, is the same as above and b=256 for the SHA 256.

The collision probability for the latter alternative decreases the chance of duplication by almost 40 orders of magnitude, so that for the foreseeable future, no two devices would have the same secure identifier 120. In other embodiments, other cryptographic functions could be used to create further distance between possible duplicates, such as a block cipher using another random number as the key.

In an embodiment, the secure identifier 120 may be registered with an authority at block 620 using a manual login and password process. However, in many embodiments, an additional process may be implemented to allow continued assertion of the secure identifier as being from the same device 102. In such an embodiment, a key pair may be generated at block 614 following a known public/private key generation sequence. The private key 124 of the key pair may be stored securely, for example, in the HSM 122.

If no certificate authority is used, the 'no' branch from block 616 may be followed to block 618 where the secure identifier 120 is signed with the device private key 124. The signed identifier and the device public key may be send to the authority 150 at block 620. The authority 150 can then store the device public key in one of the user stores 152-154 and used to confirm future activity with the device 102 by verifying data signed with the device private key 124.

If it is desirable to increase the level of security, a certificate authority 170 can be included in the process and the 'yes' branch from block 616 can be taken to block 626. There, a request can be made to the certificate authority 170 for a certificate 114. The CA 170 or a registration authority can perform a supplemental validation of the identity of the device 102, or more often, a user associated with the device 102. The process for issuing a certificate 114 is well known and not discussed here in more detail. After the CA 170 provides the certificate to the device 102, the device 102 can then send the certificate to the authority 150 at block 628. The device 102 can also then sign and send the signed secure identifier 120 to the authority 150. The authority 150 can then check the identity of the device/user using the certificate 114 and use the device public key embedded in the certificate 114 to decrypt the secure identifier 120 for the purpose of binding the secure identifier to the device 102.

The above disclosure allows late binding of devices so that a trust relationship can be developed even after a device 102 has left a secure and controlled manufacturing process. The technical effect is that the creation and storage of a device's unique identifier can be moved from the manufacturer or authority 150 to the device itself. By creating and installing the unique identifier 120 on the device 102, the need to pre-set billions of devices with transport keys or other security measures is eliminated. Because the identifier generation process and self-storage is minimally invasive, additional program memory is not required. For example, after the binding/registration process is complete, a registration application 112 can be deleted so that there is virtually no impact on the long-term configuration of the device 102. Whether the binding occurs early or late, the unalterable memory requirements are also the same.

The effect of using a combination of device characteristics and random numbers creates distance between the initial number sets. The use of the hashing or another cryptographic function, as shown above, creates a larger number space and reduces the likelihood of identifier collisions to a level that is mathematically insignificant.

The technical effect of a hardware security module 122 is that the device 102 can securely generate keys, perform cryptographic functions, such as signing and encryption, and store data with the highest level of security. In various embodiments, the HSM 122 can be in part or in whole a smart chip such as are used in smart cards for access control and financial transactions.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of binding a device to an authority, the method comprising:
   providing an unalterable memory in the device that permanently stores information written to the unalterable memory;
   reading pre-determined data corresponding to characteristics of the device;
   obtaining a pseudo-random number and combining the pseudo-random number with the pre-determined data to give a base number;
   downloading an application including executable code that performs at least, a cryptographic function on the base number that generates a secure identifier of the device;
   storing the secure identifier in the unalterable memory of the device; and
   providing, by the device, the secure identifier of the device to the authority to bind the device to the authority.

2. The method of claim 1, further comprising:
   generating a key pair on the device; and
   signing the secure identifier with a first key from the key pair prior to providing the secure identifier to the authority.

3. The method of claim 2, further comprising receiving a certificate from a certificate authority, the certificate including a second key of the key pair, wherein providing the signed secure identifier to the authority comprises providing the certificate containing the second key with the signed secure identifier.

4. The method of claim 1, wherein the cryptographic function is a one-way hash function.

5. The method of claim 1, wherein obtaining the pseudo-random number comprises obtaining the pseudo-random number at a hardware security module.

6. The method of claim 1, wherein providing the unalterable memory comprises providing a fuseable link memory.

7. A device binding system comprising:
   a device including:
   a device memory storing attributes of the device;
   an unalterable memory that stores a secure identifier of the device generated on the device; and
   a processor and program memory storing executable instructions, wherein the executable instructions implement:
   an algorithm that generates the secure identifier of the device on the device from selected attributes of the device and a pseudo-random number;
   a routine that stores the secure identifier of the device in the unalterable memory; and
   another routine that registers the secure identifier of the device with an authority;
   wherein the executable instructions are received at the device as part of the process of registering the secure identifier with the authority.

8. The device binding system of claim 7, further comprising a hardware security module that generates the pseudo-random number and stores the secure identifier.

9. The device binding system of claim 7, further comprising:
   a server at the authority that receives the secure identifier and binds the secure identifier to an entity known to the authority.

10. The device binding system of claim 7, wherein the algorithm that generates the secure identifier implements a one-way hash function to generate the secure identifier from a combination of the selected attributes of the device and the pseudo-random number.

11. A method of binding a device to an authority, the method comprising:
    generating a public key of a public-private key pair at the device;
    reading selected device data available at the device;
    downloading a registration application specific to a device type of the device;
    executing the registration application to generate a secure identifier of the device by processing the selected device data using a cryptographic routine;
    storing the secure identifier of the device in an unalterable memory on the device;
    signing the secure identifier of the device with a private key of the public-private key pair; and
    sending the signed secure identifier to the authority.

12. The method of claim 11, further comprising:
    sending a device-type identifier to an application service corresponding to the device type of the device;
    wherein the the registration application specific to the device type is downloaded from the application service; and
    wherein executing the registration application to generate the secure identifier includes using device-specific information identified by the registration application.

13. The method of claim 12, wherein executing the registration application to generate the secure identifier comprises, creating, via the registration application, a pseudo-random number at the device that is combined with the device-specific information by the cryptographic routine to generate the secure identifier.

14. The method of claim 11, wherein a pseudo-random number is received from another device coupled to the device via a short range network, the pseudo-random number used along with the selected device data by the cryptographic routine to generate the secure identifier.

15. The method of claim 11, further comprising:
    requesting registration of a public key of the public-private key pair at a certificate authority; and
    receiving, at the device from the certificate authority, a certificate that includes the public key, wherein sending the signed secure identifier to the authority includes sending the certificate and the signed secure identifier to the authority.

16. The method of claim 11, wherein storing the secure identifier in the unalterable memory comprises writing the secure identifier to the unalterable memory and executing a command that prevents the secure identifier from being modified.

* * * * *